United States Patent [19]
Kornher

[11] Patent Number: 6,094,695
[45] Date of Patent: Jul. 25, 2000

[54] STORAGE BUFFER THAT DYNAMICALLY ADJUSTS BOUNDARY BETWEEN TWO STORAGE AREAS WHEN ONE AREA IS FULL AND THE OTHER HAS AN EMPTY DATA REGISTER

[75] Inventor: Kevin Kornher, Dallas, Tex.

[73] Assignee: Texas Instruments Incorporated, Dallas, Tex.

[21] Appl. No.: 09/038,246

[22] Filed: Mar. 11, 1998

Related U.S. Application Data

[60] Provisional application No. 60/040,787, Mar. 14, 1997.

[51] Int. Cl.⁷ ...................................................... G06F 12/02
[52] U.S. Cl. ............................... 710/56; 710/57; 711/171; 711/173
[58] Field of Search ....................... 358/1.17; 365/189.01; 607/30; 709/32, 237; 711/170, 171, 173; 710/56, 57

[56] References Cited

U.S. PATENT DOCUMENTS

| 5,159,681 | 10/1992 | Beck et al. ............................. 358/1.17 |
| 5,456,691 | 10/1995 | Snell ........................................ 607/30 |
| 5,581,736 | 12/1996 | Smith ...................................... 711/170 |
| 5,602,780 | 2/1997 | Diem et al. ......................... 365/189.01 |
| 5,722,999 | 3/1998 | Snell ........................................ 607/32 |
| 5,841,988 | 11/1998 | Chennubhotla et al. ............... 709/237 |

*Primary Examiner*—Thomas C. Lee
*Assistant Examiner*—Albert Wang
*Attorney, Agent, or Firm*—Dwight N. Holmbo; W. James Brady, III; Frederick J. Telecky, Jr.

[57] ABSTRACT

An electronic storage buffer (22) is efficiently used by dividing the buffer into a first (26) and second (28) storage area with a dynamically adjustable boundary (24) governing the respective sizes of each storage area. If the first storage area becomes full with data, the first storage area can be expanded and the second storage area can be reduced to utilize the empty space in the second storage area. Conversely, the second storage area can be expanded and the first storage area can be reduced to satisfy the data storage demands of the second storage area.

19 Claims, 4 Drawing Sheets

STORAGE BUFFER THAT DYNAMICALLY ADJUSTS BOUNDARY BETWEEN TWO STORAGE AREAS WHEN ONE AREA IS FULL AND THE OTHER HAS AN EMPTY DATA REGISTER

This application claims priority under 35 USC § 119(e)(1) of provisional application No. 60/040,787 filed Mar. 14, 1997.

BACKGROUND OF THE INVENTION

1. Field of the Invention

This invention relates, in general, to temporary data storage areas such as buffers. More particularly, this invention relates to the management of receive buffers and transmit buffers used for serial communications or other temporary data storage applications.

2. Relevant Background

A buffer is a temporary data storage area typically maintained in a memory element (i.e., a RAM chip) or within the memory area of an integrated circuit or like device (i.e., the on-board RAM of a microprocessor or microcontroller integrated circuit).

In a variety of conventional applications, separate buffers are utilized to separately store different sets of data. For example, in integrated circuits or devices for serial bus interface applications, a large FIFO (first-in, first-out) buffer is often needed to buffer data received and the data to be transmitted. The FIFO buffer is typically built from a single RAM which is divided into two separate buffers, a receive data buffer and a transmit data buffer.

Buffer sizes are typically established at device initialization and the buffer sizes remain statically unchanged as long as the device is powered on. Depending on the application and the expected amount of data to be stored within a buffer, the area of a conventional buffer is often a significant portion of the total silicon area of an integrated circuit or device, since a large amount of space must be reserved so that the buffer does not overflow or underflow during a receive or transmit operation. If the buffer is about to overflow, the device can do little to avoid the overflow.

SUMMARY OF THE INVENTION

In accordance with this invention, the above problems have been solved by a method and apparatus for a storage buffer with dynamically adjustable boundaries. In a method implementation of the invention, a new piece of data is stored in a buffer by establishing a first storage area having a first plurality of data storage registers for storing data in the buffer. A second storage area is established having a second plurality of data storage registers for storing data. An adjustable boundary is created which is movable within the first storage area and the second storage area, the adjustable boundary defining the size of the first storage area and the second storage area. When the first storage area is full, if the second storage area has an empty register in the second plurality of data storage registers, the adjustable boundary is moved within the second plurality of data storage registers so that the empty register of the second storage area is allocated to the first storage area, and the new piece of data is stored in the empty register. Conversely, when the second storage area is full, if the first storage area has an empty register in the first plurality of data storage registers, the adjustable boundary is moved within the first plurality of data storage registers so that the empty register of the first storage area is allocated to the second storage area, and the new piece of data is stored in the empty register.

The second storage area can be aligned to the first storage area so that the bottom of the first storage area is adjacent to the bottom of the second storage area, and the adjustable boundary is initially positioned between the bottom of the first storage area and the bottom of the second storage area.

Buffer pointers are used to monitor the buffer and manage the placement and removal of data from the buffer. A first head pointer is associated with the first storage area for indicating a next storage register in the buffer for placing the new piece of data, and a first tail pointer is associated with the first storage area for indicating a first register of the first storage area which contains data. A second head pointer is associated with the second storage area for indicating a next storage register in the buffer for placing the new piece of data, and a second tail pointer is associated with the second storage area for indicating a first register of the second storage area which contains data.

In a machine implementation of the invention, an electronic storage buffer apparatus for storing data is made with a first storage area, a second storage area, an adjustable boundary, and control logic. The first storage area has a first plurality of data storage registers, and the second storage area has a second plurality of data storage registers. The dynamically adjustable boundary defines the size of the first storage area and the second storage area and is movable within the first plurality of data storage registers and the second plurality of data storage registers. The control logic is coupled to the adjustable boundary for moving the adjustable boundary within the first plurality of data storage registers and the second plurality of data storage registers so that an empty register of the first plurality of data storage registers can be allocated to the second storage area.

The control logic has a module for adding a data word to the first storage area, removing a data word from the first storage area, adding a data word to the second storage area, and removing a data word from the second storage area. The control logic utilizes buffer pointers for manipulation of data in the buffer and control of the adjustable boundary. The buffer control logic monitors a first head pointer, a first tail pointer, a second head pointer, and a second tail pointer to move the adjustable boundary.

The first storage area can be configured as a transmit buffer for storing data to be transmitted from the transmit buffer, and the second storage area can be configured as a receive buffer for storing data received in the receive buffer from a communications interface.

The above method steps are provided in another implementation of the invention as an article of manufacture, i.e., a computer storage medium containing a computer program of instructions for performing the above-described steps.

The great utility of the present invention will allow buffer sizes to increase and decrease as needed for the immediate operational needs of the device. Dynamic sizing allows continuous buffer size adjustments, even for example during a receive or transmit operation of a serial bus interface device.

Another utility of the present invention is that dynamic buffer sizing allows a much smaller amount of memory space to be reserved in an integrated circuit for data storage. This is possible because if the buffer (i.e., a receive buffer) is about to overflow, it can be dynamically enlarged to possibly avoid the overflow.

These and other objects, features and advantages of the invention will be apparent to those skilled in the art from the following detailed description of the invention, when read in conjunction with the accompanying drawings and appended claims.

DETAILED DESCRIPTION OF THE PREFERRED EMBODIMENTS

The present invention is a data storage buffer having an adjustable boundary between at least two storage areas within the buffer. The position of the adjustable boundary within the buffer determines the size of each storage area in the buffer, and is dynamically changed depending on the present conditions of the buffer so that the amount of unused space in the buffer is efficiently utilized.

The present invention will now be described with reference to two storage areas—a receive buffer and a transmit buffer—formed from a single area of memory space. It will be understood that the present invention generally could be used to efficiently utilize the memory storage capacity of a single RAM buffer divided into two or more storage areas of buffers for storing data from two or more data sets.

Figure 1:
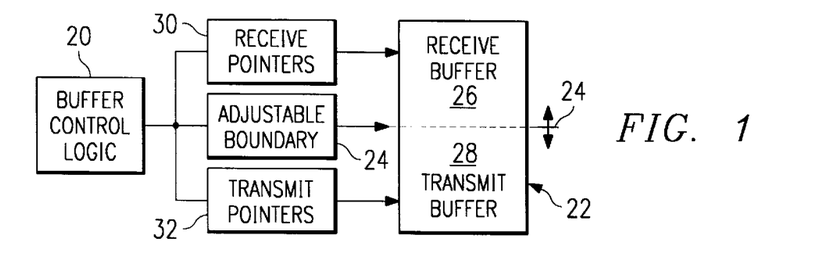
FIG. 1 illustrates a block diagram of the present invention showing a buffer 22 with an adjustable boundary 24.

Referring to FIG. 1, buffer control logic 20 manages the data operations of memory space 22, configured as a buffer for storage of data. Buffer 22 is formed from a first storage area and a second storage area, shown in FIG. 1 as a receive buffer 26 and a transmit buffer 28.

In accordance with the present invention, buffer 22 has an adjustable boundary 24 between the first storage area, receive buffer 26, and the second storage area, transmit buffer 28. The adjustable boundary 24 is moved within the buffer, under the control of buffer control logic 20, based on the present conditions and demands upon buffer 22. As the adjustable boundary is moved within buffer 22, the size of receive buffer 26 increases or decreases, and conversely, the size of transmit buffer 28 correspondingly decreases or increases.

As shown in FIG. 1, receive buffer 26 has receive pointers 30 associated therewith, and transmit buffer 28 has transmit pointers 32. In accordance with the present invention, buffer control logic 20 manages the placement and removal of data in the buffer 22 using the receive pointers 30, the transmit pointers 32, and the adjustable boundary 24.

The receive buffer 26 could be used, for example, to temporarily store data words received from a serial communications port (not shown) until a microprocessor or other similar device (not shown) can remove the data from the receive buffer. Transmit buffer 28 could be used, for example, to temporarily store data words for transmission from a microprocessor or other similar device (not shown) to an external serial communications link (not shown). In accordance with the present invention, the sizes of the first and second storage areas can be dynamically changed over many transmit/receive cycles. This will allow the use of a smaller RAM by making better use of each memory location in both storage spaces.

Figure 2:
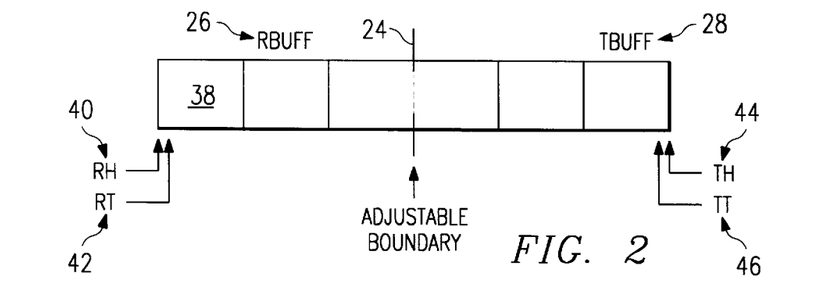
FIG. 2 illustrates an example of an embodiment of a buffer of the present invention having an adjustable boundary 24 between the receive buffer 26 and the transmit buffer 28, the buffer having a six data word capacity.

FIG. 2 illustrates an example of a buffer having an adjustable boundary 24 in accordance with the present invention. As shown in FIG. 2, the buffer is divided into a receive buffer area 26 and a transmit buffer 28. The adjustable boundary separates the receive buffer 26 from the transmit buffer 28 and therefore governs the relative size of each buffer 26 and 28. The example buffer shown in FIG. 2 has six registers or slots 38 for the storage of individual data words within the buffer. For purposes of describing the present invention, the six registers in the buffer can be numbered from 0 to 5, register 0 being the leftmost register of the receive buffer and register 5 being the rightmost register of the transmit buffer. Since the adjustable boundary is located on either side of a data register, there are seven boundary locations for FIG. 2—the leftmost boundary location is boundary location 0 and the rightmost boundary location is boundary location 6. The boundary location for adjustable boundary 24 actually shown in FIG. 2 is boundary location 3. It is understood that the buffer shown in FIG. 2 is by way of example to illustrate the operations of the present invention, and that the buffer could generally have more or less than the six registers 38 shown in FIG. 2.

The pointers for the receive and transmit buffers are also shown in FIG. 2. These pointers are utilized by the buffer control logic 20 (FIG. 1) for the data management functions of the buffer. Receive buffer 26 has a receive head pointer 40 (RH) and a receive tail pointer 42 (RT). The RH pointer 40 points to "head" of the buffer (i.e., the next available register for storage of new data in the receive buffer), while the RT pointer 42 points to the "tail" or end of the buffer (i.e., the register containing the next piece of data to be removed from the buffer, which is generally the oldest piece of data in the buffer). The transmit buffer 28 has a transmit head pointer 44 (TH) and a transmit tail pointer 46 (TT). The TH pointer 44 points to the "head" of the buffer (i.e., the next available register for placement of data in the transmit buffer) and the TT pointer 46 points to the "tail" or end of the buffer (i.e., the register containing the next piece of data to be removed from the buffer for transmission, which is generally the oldest piece of data in the buffer).

These pointers assist with management of the data in the buffer. When RH=RT or TH=TT, the respective buffer is either completely full or completely empty. Additional information about the buffer is maintained to determine whether the buffer is full or empty, including wrap flags RHW, RTW, THW, and TTW indicating when the head or tail pointers have wrapped around their respective buffers.

The present invention also utilizes a unique method for placing data in the buffers. Conventional buffer designs generally initialize their buffer pointers at low memory addresses for the beginning of each buffer and maintain a static boundary for the end of the buffer at a higher memory address. Data is placed in the buffer beginning at a low memory address for the buffer, and the buffer is filled from this low memory address towards the end of the buffer at the higher memory address.

Unlike conventional buffer designs, the buffer pointers for each adjacent buffer in the present invention are initialized on opposing ends of the memory space allocated for data storage. Further, the buffers of the present invention are filled towards the adjustable boundary so that unused space in one buffer can be allocated for and utilized by the adjacent buffer. The adjustably boundary, in effect, defines the end of both the receive and transmit buffers. This is illustrated in FIG. 2, where the receive buffer pointers 40 and 42 are initialized at the opposite end of the memory space as the transmit buffer pointers 44 and 46. Pointers 40, 42 are initialized at the lowest memory address of buffer 26, while pointers 44, 46 are initialized at the highest memory address of buffer 28. Both buffers are filled with new data towards the adjustable boundary. The adjustable boundary can then be moved so that any free space in one of the buffers can be utilized by the other buffer. Additionally, whenever a buffer becomes empty, the pointers for that buffer can be moved back to the initial position, thus increasing the likelihood of having free space in the registers near the adjustable boundary between the buffers.

The buffer design of the present invention is particularly useful in a serial communications system having a receive and transmit buffer, since it can be wasteful to continuously reserve buffer space for both received and transmitted data because data, in some cases, cannot be simultaneously transmitted and received. The present invention can also be used in other data storage applications where there are two or more buffers made from at least one memory space or block.

In accordance with the present invention, buffer control logic 20 (FIG. 1) can perform four functions, with adjustable boundary 24, for management of data within the buffer 22. These four functions comprise adding a piece of data to the first buffer, removing a piece of data from the first buffer, adding a piece of data to the second buffer, and removing a piece of data from the second buffer. These four functions are illustrated in FIGS. 3–6 and are shown and described where the first buffer is a receive buffer, the second buffer is a transmit buffer, and the piece of data is a data word. It will be understood by one of ordinary skill in the art that the implementation of these four functions shown in FIGS. 3–6 is a matter of choice dependent upon the particular implementation chosen. To the extent that the control logic may have to deal with uncertainties such as the size of the next data packet received, a control logic circuit using fuzzy logic techniques may be appropriate.

Figure 3:
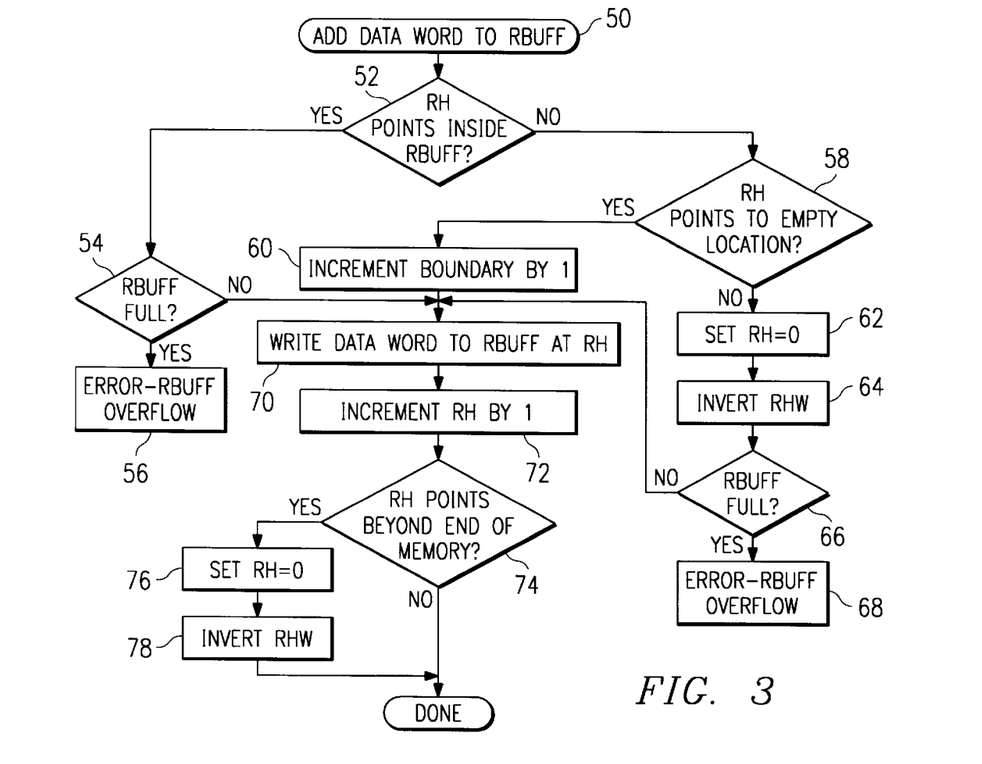
FIG. 3 illustrates the logical operations for adding a data word to the receive buffer example shown in FIG. 2.

FIG. 3 illustrates the logical operations to add a data word to the receive buffer using an adjustable boundary in accordance with the present invention. In general, the position of the adjustable boundary is initialized to some initial position within the memory space thereby establishing an initial size of the receive buffer. Data words are then placed in the receive buffer until the receive head pointer RH of the receive buffer points beyond the adjustable boundary into the adjacent transmit buffer area. This indicates that the receive buffer, whose size is defined by the current position of the adjustable boundary, is presently full. If there is available free space in the adjacent transmit buffer, then the adjustable boundary is moved to capture the amount of free space from the transmit buffer needed by the receive buffer.

Decision operation 52 of FIG. 3 determines if the receive head pointer RH points inside the receive buffer. This operation can be performed by comparing the position of the receive head pointer RH to the location of the adjustable boundary.

If decision operation 52 determines that the receive head pointer RH does not point inside the receive buffer (i.e., RH is pointing beyond the position of the adjustable boundary into the adjacent buffer), then decision operation 58 determines if the receive head pointer RH points to an empty location in the adjacent buffer. This decision operation can be performed by examining the current state of the buffer pointers and the wrap flags. The register pointed to by RH, being next to the adjustable boundary, will be empty if TH=TT and THW=TTW; or if TH<TT and TH points at or beyond the register (i.e., at or to the right of the register in FIG. 2). If the register pointed to by the RH pointer is empty, then the receive buffer can be enlarged by one register of the adjacent transmit buffer. Operation 60 therefore increments the adjustable boundary by one to allocate the empty register of transmit buffer for use by the receive buffer, and control is passed to operation 70, described below.

If decision operation 58 determines that the receive head pointer RH does not point to an empty location in the buffer, then operation 62 sets the receive head RH pointer to zero so that it points to the beginning of the receive buffer. Operation 64 inverts a receive head wrap flag RHW which tracks when receive buffer head RH has wrapped from the end of the receive buffer to the start of the receive buffer. The RHW flag is maintained, along with a receive tail wrap flag RTW described below, as one way to determine if the receive buffer is full. As previously described, if RH=RT, then the receive buffer is either full or empty. Then if RHW=RTW, then the receive buffer is empty, otherwise the receive buffer is full.

Decision operation 66 determines if the receive buffer is full (i.e., RH now points to a non-empty register), and if it is full, operation 68 indicates a receive buffer overflow error. If the receive buffer is not full at decision operation 66 (i.e., RH now points to an empty register), then control is passed to operation 70, described below.

Referring to decision operation 52, if the receive head RH pointer points inside the receive buffer (i.e., RH is not beyond the position of the adjustable boundary in the receive buffer), then decision operation 54 determines if the receive buffer is full. If the receive buffer is full, then operation 56 indicates a receive buffer overflow error because no additional data can be placed in the receive buffer and the adjustable boundary cannot be moved to create more space for new data. If the receive buffer is not full, then control is passed to operation 70.

Operation 70 writes the data word to the receive buffer at the register location indicated by the receive head pointer RH. Operation 72 then increments the receive head pointer RH by one, so that RH now points to the next register location.

Decision operation 74 determines if the receive head pointer RH now points beyond the end of memory (i.e., beyond the location of the entire memory allocated for both buffers). If not, then the operations are complete. However, if the receive head pointer RH now points beyond the end of memory as determined by decision operation 74, then operation 76 wraps the receive head pointer RH to the first register of the receive buffer, and inverts the receive head wrap flag RHW.

Figure 4:
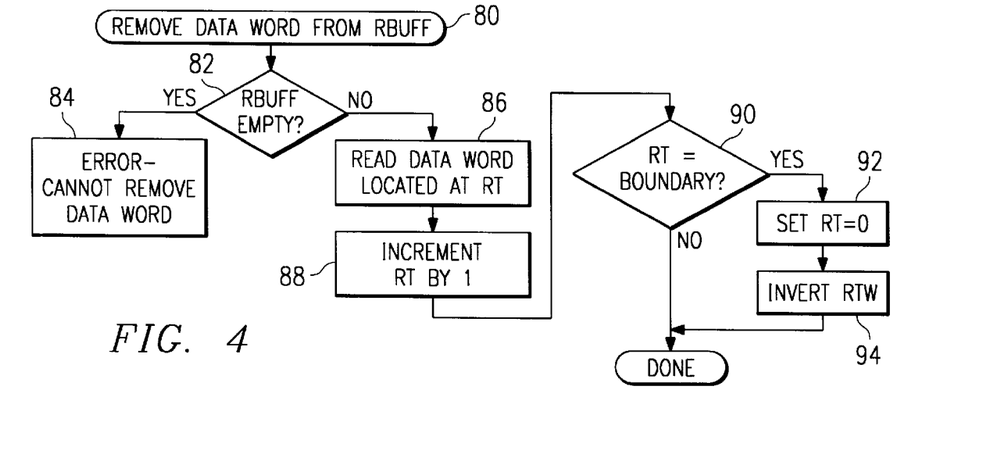
FIG. 4 illustrates the logical operations for removing a data word from the receive buffer example shown in FIG. 2.

FIG. 4 illustrates the logical operations for removing a data word from the receive buffer using the adjustable boundary of the present invention. In general, data words pointed to by the receive tail pointer RT in the receive buffer are removed. For each data word removed, the RT pointer is moved accordingly to point to the next register in the receive buffer.

Decision operation 82 determines if the receive buffer is empty. If so, then there are no data words to be removed and operation 84 indicates this appropriately. Otherwise, decision operation 82 passes control to operation 86.

Operation 86 reads the data word located at the present register location of the receive tail pointer RT, and removes the data word from the buffer. Operation 88 then increments the receive tail pointer RT by one so that RT points to the next register position in the receive buffer. Decision operation 90 tests if the receive tail pointer RT is beyond the location of the adjustable boundary. If so, then the receive tail pointer RT has reached the end of the buffer and needs to be reset to the beginning of the buffer so that other data words, if they exist, can also be read and removed from the buffer. Operation 92 sets the receive tail pointer RT to zero (i.e., the beginning of the receive buffer) and operation 94 inverts a receive tail wrap flag (RTW) 94 used to track when RT has wrapped around the receive buffer.

Figure 5:
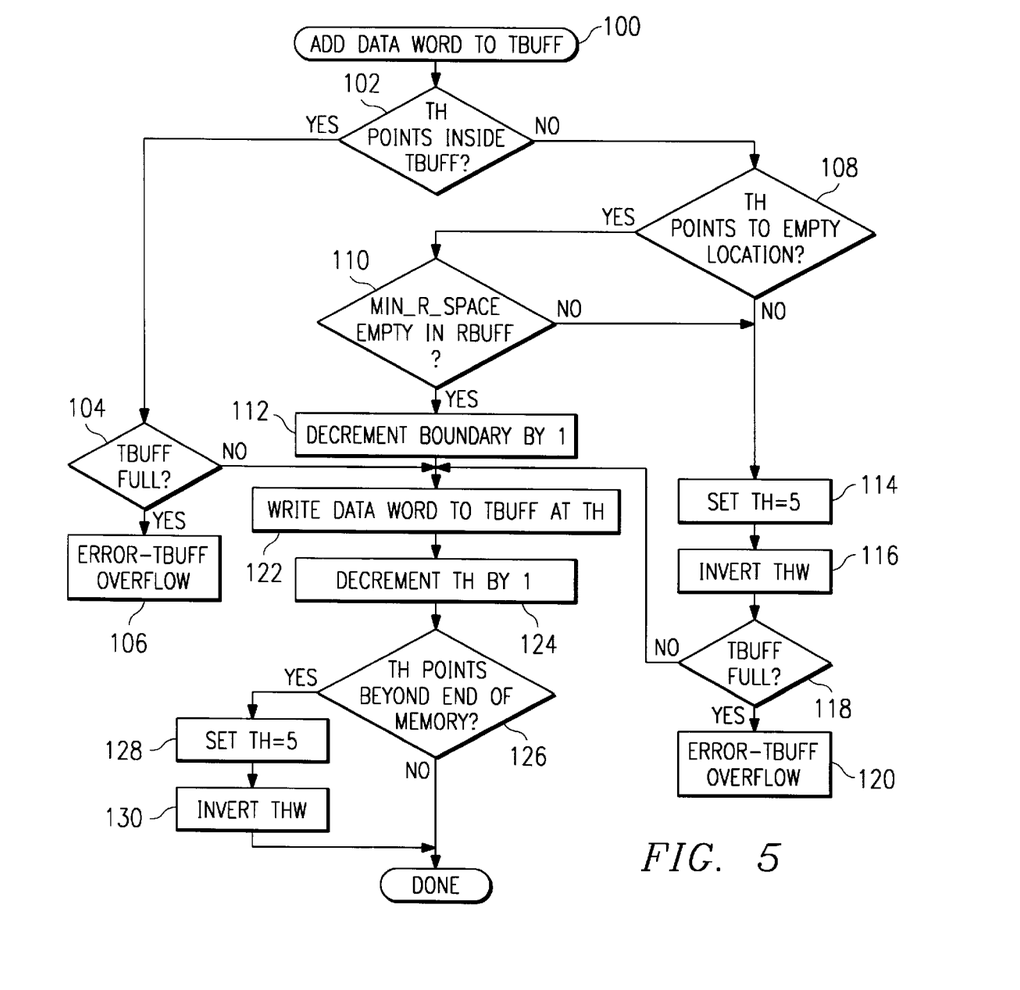
FIG. 5 illustrates the logical operations for adding a data word to the transmit buffer example of FIG. 2.

FIG. 5 illustrates the logical operations for adding a data word to the transmit buffer having an adjustable boundary in accordance with the present invention. In general, these operations are similar to the operations shown in FIG. 3 for adding a word to the receive buffer. The position of the adjustable boundary is initialized to some initial position within the memory space thereby establishing an initial size of the transmit buffer.

As previously mentioned, the adjustable boundary defines the end of both the receive and transmit buffers, and the pointers for the transmit buffer are accordingly initialized opposite the adjustable boundary in the transmit buffer. Data is then placed in the transmit buffer for transmission until the transmit head pointer TH of the transmit buffer points beyond the adjustable boundary into the adjacent receive buffer area. This indicates that the transmit buffer, whose size is defined by the current position of the adjustable boundary, is presently full. If there is available free space in the adjacent receive buffer, then the adjustable boundary is moved to capture the amount of free space from the receive buffer for the transmit buffer.

The operations shown in FIG. 5 illustrate an additional feature of the present invention. Depending of the desired performance of the buffering system, a minimum amount of storage space can be maintained in the receive buffer. This is shown in FIG. 5 as a variable MIN_R_SPACE. The MIN_R_SPACE value limits the size to which the transmit buffer can expand into the receive buffer. In this way, a minimum amount of storage space in the receive buffer can be reserved for exclusive use by the receive buffer. During operation, it would also be possible to monitor buffer occupancy statistics and dynamically adjust the MIN_R_SPACE value accordingly.

Decision operation 102 of FIG. 5 determines if the transmit head pointer TH points inside of the transmit buffer. This operation can be performed by comparing the position of the transmit head pointer TH to the location of the adjustable boundary.

If decision operation 102 determines that the transmit head pointer TH does not point inside of the transmit buffer (i.e., TH is pointing beyond the current position of the adjustable boundary into the adjacent buffer), then decision operation 108 determines if the transmit head pointer TH points to an empty location within the receive buffer. This decision operation can be performed by examining the current state of the buffer pointers and the wrap flags. The register pointer to by TH, being next to the adjustable boundary, will be empty if RH=RT and RHW=RTW; or if RH>RT and the register is at or beyond the location of RH (i.e., at or to the right of RH in FIG. 2). If the register location is empty, then the transmit buffer can be enlarged by allocating one register of the adjacent receive buffer, subject to the optional MIN_R_SPACE limit.

Decision operation 110 determines if the minimum receive space MIN_R_SPACE previously defined is empty and unused in the receive buffer. If so, then operation 112 moves the adjustable boundary to expand the transmit buffer by one register space (i.e., decrements the adjustable boundary by one position within the adjacent receive buffer), and control is passed to operation 122.

If operation 110 determines the minimum receive space is not available or empty in the receive buffer, then control is passed to operation 114. Likewise, if decision operation 108 determines that the transmit head pointer TH does not point to an empty location, then control is passed to operation 114.

Operation 114 moves the location of the transmit head TH pointer to the first register location in the transmit buffer (i.e., in the six-register buffer shown in FIG. 2, the first register location is the rightmost register) and operation 116 inverts a transmit head wrap (THW) flag, indicating that the transmit head point TH has wrapped around the buffer.

As with the receive buffer, the THW flag is maintained, along with a transmit tail wrap flag TTW described below, as one way to determine if the transmit buffer is full. As previously described, if TH=TT, then the transmit buffer is full or empty. Then if THW=TTW, then the transmit buffer is empty, otherwise the transmit buffer is full. Decision operation 118 determines if the transmit buffer is now full, and if so, operation 120 indicates a transmit buffer overflow error. If the transmit buffer is not full, then control is passed to operation 122.

If the transmit head pointer TH points inside the transmit buffer as detected by operation 102 (i.e., TH is not beyond the position of the adjustable boundary in the transmit buffer), then control is passed to decision operation 104 which determines if the transmit buffer is full. If the transmit buffer is full, then a transmit buffer overflow error is indicated at operation 106 as no more data can be placed in the transmit buffer and the adjustable boundary cannot be moved to expand the transmit buffer. Otherwise, control is passed to operation 122, described below, to write a data word to the buffer.

Operation 122 writes the data word to the transmit buffer at the register location indicated by the transmit head pointer TH. Operation 124 then moves (i.e., decrements) the transmit head pointer TH by one, so that TH now points to the next register location. Decision operation 126 determines if the transmit head pointer TH points to a location beyond the end of memory allocated for both buffers, and if so, operation 128 sets the transmit head pointer to the first register location of the transmit buffer (i.e., register location five in FIG. 2), and operation 130 inverts the transmit head wrap flag THW.

Figure 6:
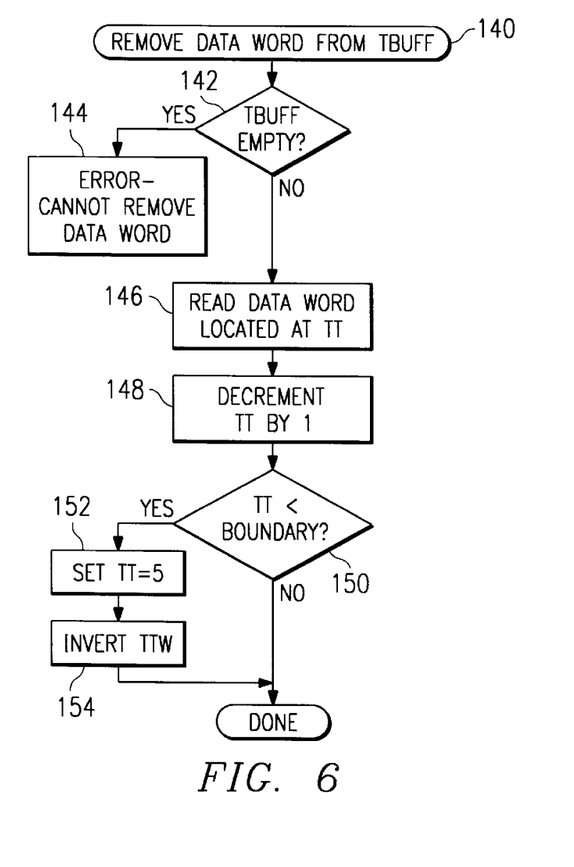
FIG. 6 illustrates the logical operations for removing a data word from the transmit buffer example of FIG. 2.

FIG. 6 illustrates the logical operations for removing a data word from the transmit buffer. Decision operation 142 determines if the transmit buffer is empty. If the transmit buffer is empty, then there are no data words to be removed from the transmit buffer, and operation 144 indicates this error appropriately. If the transmit buffer is not empty, then operation 146 reads the data word located at the register pointed to by the transmit tail pointer TT, and removes this data word from the transmit buffer. Operation 148 then moves (i.e., decrements) the transmit tail pointer TT by one register location to point to the next register in the buffer which may contain a data word.

Decision operation 150 determines if, after moving the transmit tail TT pointer TT, the pointer TT points outside of the range of the transmit buffer (i.e., TT is less than the current position of the adjustable boundary, and points into the adjacent receive buffer). If so, then operation 152 resets the location of the transmit tail pointer TT to the beginning of the transmit buffer (i.e., to register five in FIG. 2), and operation 154 inverts the transmit tail wrap flag TTW.

Figure 7A:
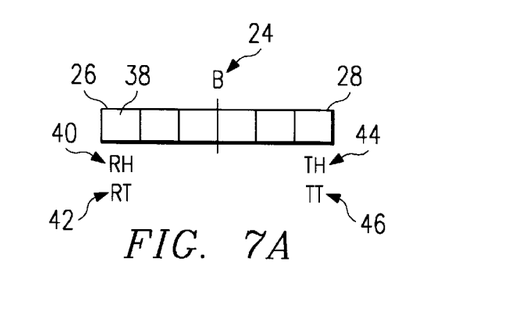
FIG. 7A illustrates an exemplary six word buffer having an adjustable boundary 24, receive buffer pointers 40, 42, and transmit buffer pointers 44, 46 in accordance with the present invention.
Figure 7B:
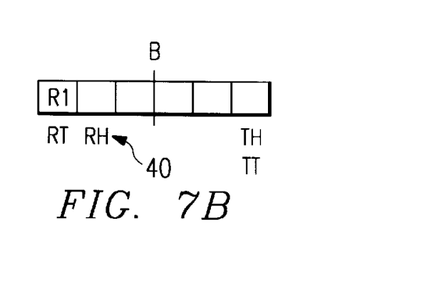
FIG. 7B illustrates the example buffer of FIG. 7A wherein a data word R1 has been received.
Figure 7C:
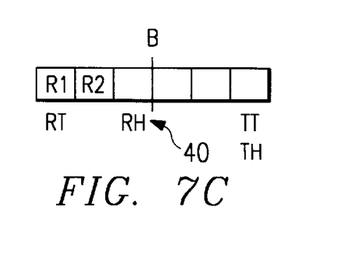
FIG. 7C illustrates the example buffer of FIG. 7B wherein a data word R2 has been received.
Figure 7D:
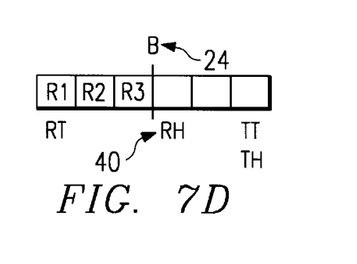
FIG. 7D illustrates the example buffer of FIG. 7C wherein a data word R3 has been received.
Figure 7E:
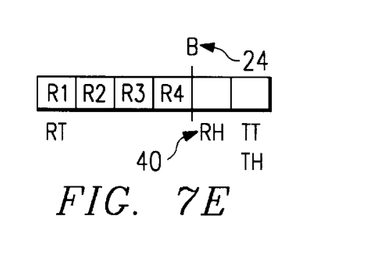
FIG. 7E illustrates the example buffer of FIG. 7D wherein a data word R4 has been received and adjustable boundary 24 has been moved.
Figure 7F:
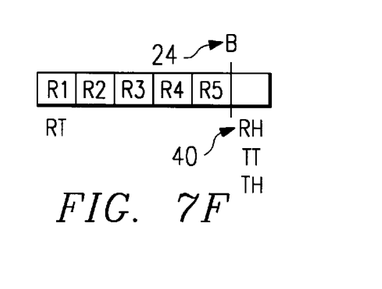
FIG. 7F illustrates the example buffer of FIG. 7E wherein a data word R5 has been received and adjustable boundary 24 has been moved.
Figure 7G:
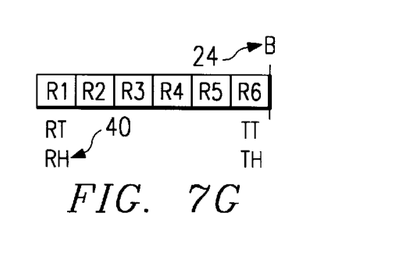
FIG. 7G illustrates the example buffer of FIG. 7F wherein a data word R6 has been received and adjustable boundary 24 has been moved.
Figure 7H:
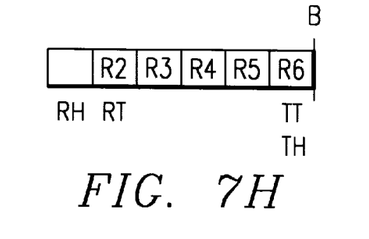
FIG. 7H illustrates the example buffer of FIG. 7G wherein the data word R1 has been removed from the buffer.
Figure 7I:
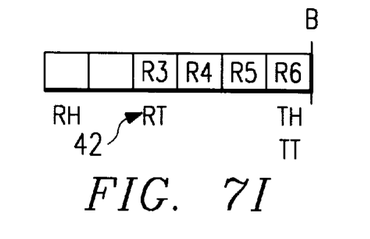
FIG. 7I illustrates the example buffer of FIG. 7H wherein the data word R2 has been removed from the buffer.
Figure 7J:
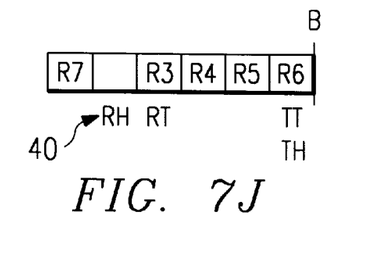
FIG. 7J illustrates the example buffer of FIG. 7I wherein a data word R7 has been received.
Figures 7K, 7M:
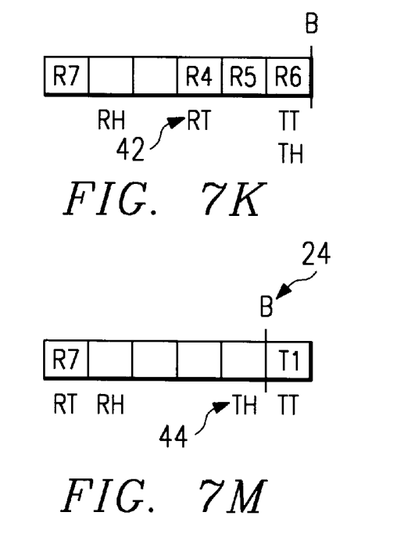
FIG. 7K illustrates the example buffer of FIG. 7J wherein the data word R3 has been removed from the buffer.
FIG. 7M illustrates the example buffer of FIG. 7L wherein a data word T1 is added to the buffer and adjustable boundary 24 has been moved.
Figure 7L:
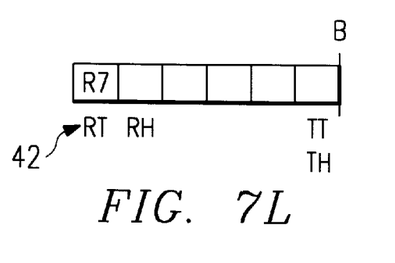
FIG. 7L illustrates the example buffer of FIG. 7K wherein the data words R4, R5, and R6 have been removed from the buffer.
Figure 7N:
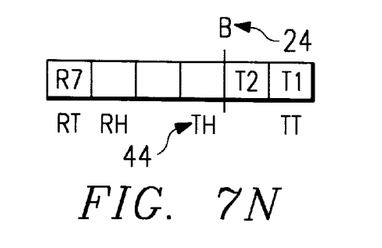
FIG. 7N illustrates the example buffer of FIG. 7M wherein a data word T2 is added to the buffer and adjustable boundary 24 has been moved.
Figure 7O:
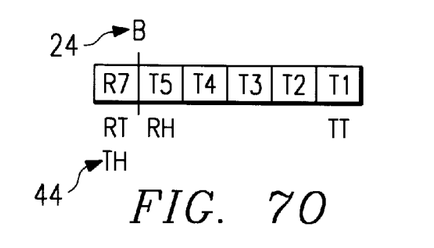
FIG. 7O illustrates the example buffer of FIG. 7N wherein data words T3, T4, and T5 are added to the buffer and adjustable boundary 24 has been moved.
Figure 7P:
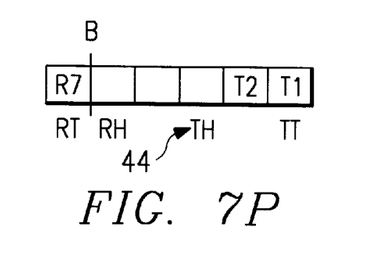
FIG. 7P illustrates the example buffer of FIG. 7O wherein the data words T3, T4, and T5 have been invalidated in the buffer.
Figure 7Q:
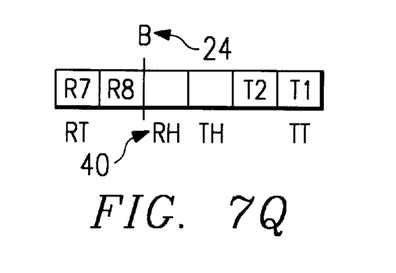
FIG. 7Q illustrates the example buffer of FIG. 7P wherein a data word R8 has been added to the buffer and adjustable boundary 24 has been moved.

FIGS. 7A–7Q illustrate an example of various scenarios and operations of the processes previously described. FIG. 7A shows a buffer having six registers 38 divided into a receive buffer area 26 and a transmit buffer area 28. Adjustable boundary 24 divides the buffer into the receive and transmit areas. The receive buffer has a receive head pointer RH 40 and a receive tail pointer RT 42. The transmit buffer 28 has a transmit head pointer TH 44 and a transmit tail pointer TT 46. As previously described, in accordance with the present invention the pointers for each buffer are initialized on opposing sides of the memory space, and both the receive buffer 26 and the transmit buffer 28 will be filled with new data towards the adjustable boundary 24.

FIG. 7B shows the buffers of FIG. 7A after a data word R1 has been received and added to the receive buffer. The data word is placed in the first register of the receive buffer at the RH pointer location 40 shown in FIG. 7A. The RH pointer 40 is then moved to point to the second register location within the receive buffer, as shown in FIG. 7B.

In FIG. 7C, a second data word R2 is received and placed in the receive buffer in the register pointed to by the RH pointer shown in FIG. 7B. The RH pointer is then moved to point to the next available location in the receive buffer as shown in FIG. 7C.

In FIG. 7D, a third data word R3 is received and is placed in the register location indicated by the RH pointer of FIG. 7C. The RH pointer is then moved so that it now points into an area within the adjacent transmit buffer beyond the location of the adjustable boundary 24. Note that the RH pointer is pointing to an empty register location in the adjacent transmit buffer area.

In FIG. 7E, a fourth data word is received and placed in the receive buffer. Under conventional buffer designs having fixed or static boundaries, the receive buffer would overflow upon receipt of the new data word R4. However, under the present invention, the new data word R4 can be placed in the receive buffer after the size of the receive buffer has been expanded to include an empty register from the adjacent transmit buffer.

In particular as shown in FIG. 7E, the adjustable boundary 24 is moved (i.e., incremented) to utilize an empty register in the adjacent transmit buffer. Because the RH pointer of FIG. 7D pointed to an empty register location unused by the transmit buffer, the adjustable boundary 24 is moved (i.e., incremented) so that this empty register is allocated for the receive buffer, and the data word R4 is placed in this register. In this manner, overflow of the receive buffer is avoided by utilizing empty space in the transmit buffer. As shown in FIG. 7E, the RH pointer is then moved so that it points into an area within the adjacent transmit buffer beyond the location of the adjustable boundary 24. Note that the RH pointer is again pointing to an empty register location in the adjacent transmit buffer area.

In FIG. 7F, a fifth data word R5 is received. Again, because the RH pointer in FIG. 7E is pointing to an empty register location, the adjustable boundary 24 is moved to allocate this empty register for the receive buffer to avoid a receive data overflow error, and the data word R5 is placed into this register. The RH pointer is then moved to the next register location as shown in FIG. 7F. Note that the RH pointer is again pointing to an empty register location in the adjacent transmit buffer area.

In FIG. 7G, a sixth data word R6 is received. Because the RH pointer of FIG. 7F pointed to an empty location in the adjacent transmit buffer, the adjustable boundary 24 is moved and the data word R6 is placed in the register pointed to by the RH pointer in FIG. 7F, and a receive data overflow error is again avoided. Referring to FIG. 7G, the transmit buffer size is now zero, and there are no more empty register locations as the entire memory space is full (i.e., all six registers have valid data therein). Because the receive head pointer RH points, after incrementing, beyond the end of memory space for these buffers, the RH pointer is reset (i.e., wrapped) to the to the first position in the buffer. At this point, the receive buffer, using the adjustable boundary of the present invention, contains twice as many data words as would be permitted in a buffer having a fixed boundary between the receive and transmit areas.

If any additional data words are received beyond the maximum number of registers in the entire memory space, then it is a matter of choice as to how to handle the buffer overflow condition.

FIG. 7H shows the data word R1 being removed or read from the receive buffer, and the receive tail pointer RT is appropriately moved to point to the register containing the next piece of data to be removed from the receive buffer. FIG. 7I shows the data word R2 removed or read from the receive buffer, and again the receive tail pointer RT is moved to point to the next data word R3 in the receive buffer.

FIG. 7J then shows a data word R7 received and placed in the receive buffer at the register location pointed to by the RH pointer of FIG. 7I. The RH pointer is then accordingly moved to point to the next location in the receive buffer as shown in FIG. 7J.

In FIG. 7K, the data word R3 is removed or read from the receive buffer and the receive tail pointer RT is incremented to point to the next data word R4 in the receive buffer.

In FIG. 7L, the data words R4, R5, and R6 are removed/read from the receive buffer, and the receive tail pointer RT is wrapped to point to the remaining data word R7 in the receive buffer.

FIG. 7M shows a data word T1 added to the transmit buffer at the empty register location pointed to by the transmit head pointer TH shown in FIG. 7L. Accordingly, the adjustable boundary 24 is moved (i.e., decremented) and the transmit head pointer TH is also moved (i.e., decremented) to point to the next register location. The TH pointer now points to an empty register located in the adjacent receive buffer.

In FIG. 7N, a second data word T2 is added to the transmit buffer at the empty register location indicated by the TH pointer shown in FIG. 7M. The TH pointer is then moved (i.e., decremented) so that it points to the next location in the buffer, and the adjustable boundary 24 is also correspondingly decremented.

In FIG. 7O, data words T3, T4, and T5 are added to the transmit buffer. The transmit head pointer 44 now points to the non-empty register location containing data word R7. The adjustable boundary 24 has also been appropriately shifted. At this point, the entire memory space is full. If another word R8 is received, it would ordinarily cause an overflow of the receive buffer. To eliminate the overflow problem, some or all of the data words in the transmit buffer could be marked as invalid, removed from the transmit buffer, and the transmit head pointer could be moved accordingly. This can be done because a copy of the transmit data typically exists in another location of the system, such as the computing system's main memory, and could be reloaded into the transmit buffer at a later time when the buffer has available free space.

In FIG. 7P, the transmit data words T5, T4, and T3 have been marked as invalid, removed from the transmit buffer, and the transmit head pointer TH has been moved to the register location after the last valid data word T2 in the transmit buffer. As a result, there are now three empty registers in the transmit buffer. This permits the adjustable boundary 24 to be moved to accommodate an incoming received data word R8 because the receive head pointer RH now points to an empty register location in the adjacent transmit buffer.

In FIG. 7Q, the receive buffer is expanded by one register so that a received data word R8 is placed into the receive buffer at the register location pointed to by the receive head pointer RH shown in FIG. 7P. The adjustable boundary 24 and the RH pointer have been accordingly moved.

These examples of FIGS. 7A–7Q illustrate a specific implementation of a dynamically adjustable boundary between two adjacent buffers. In another embodiment of the present invention, specifically with respect to the overflow situation which was present in FIG. 7O, a limit can be placed on the expansion of the transmit buffer size such that some memory space is reserved for the receive buffer (i.e., MIN_R_SPACE, previously discussed). The limit could be expressed in many ways, such as a maximum total space for the transmit buffer or a minimum number of empty spaces required in the receive buffer. During operation of the buffer, it would be possible to monitor the buffer occupancy statistics and adjust these buffer size restrictions accordingly.

While the adjustable boundary position has been shown as moving in one-word increments, other increments could also be used and, if larger increments are used, may reduce the gate count of the pointer or control circuitry (FIG. 1). The exact implementation details will depend on the specific application. It is also possible to tune the adjustable boundary movement for a given system. The buffers have herein been described as receive and transmit buffers, and it is implied that the receive function has higher priority. However, these names and conditions are meant only as an example and do not limit the scope of the present invention.

It is also understood that while two buffers have been described with an adjustable boundary, a series of buffers could be arranged utilizing the methods disclosed herein for maintaining more than two storage buffers with dynamically adjustable boundaries. Further, while the buffers discussed herein have been shown and described as "adjacent", it is understood that the buffers could be separated by some known offset or that the first and second storage areas could be physically located in non-adjacent sections of an integrated circuit without departing from the spirit of the invention.

It will be also understood by one of ordinary skill in the art that the above-described invention could be realized in a hardware implementation, a software method, or otherwise. Buffers with dynamically adjustable boundaries could be built using existing digital logic design techniques and existing ASIC design flows. One such design flow involves writing a circuit description in a language such as Verilog. The circuit description is then converted to a technology specific ASIC gate level netlist using a commercially available synthesis tool. The gate level netlist is then converted to an IC layout through the use of pre-designed library cells and place-and-route software.

Software implementation of the present invention could be achieved by programming a microprocessor or other processing device with steps to implement the general operations described above for managing the adjustable boundary, the buffer pointers, and the data in the buffers. For example, a conventional microprocessor or general purpose computer could be programmed to utilize the adjustable boundary of the present invention.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. An electronic storage buffer for storing data, comprising:
 a first storage area having a first plurality of data storage registers;
 a second storage area having a second plurality of data storage registers;
 a dynamically adjustable boundary for defining the size of said first storage area and said second storage area, said adjustable boundary movable within said first plurality of data storage registers and said second plurality of data storage registers to increase the size of said second storage area when said second storage area has no empty data storage registers and said first storage area has at least one empty data storage register such that the size of said first storage area can be reduced to zero when said first plurality of data storage registers is empty and further to increase the size of said first storage area when said first storage area has no empty data storage registers and said second storage area has at least one empty data storage register such that the size of said second storage area can be reduced to zero when said second plurality of data storage registers is empty; and control logic coupled to said adjustable boundary for moving said adjustable boundary within said first plurality of data storage registers and said second plurality of data storage registers so that an empty register of said first plurality of data storage registers can be allocated to said second storage area.

2. The buffer of claim 1, wherein said control logic has a module for adding a data word to said first storage area.

3. The buffer of claim 1, wherein said control logic has a module for removing a data word from said first storage area.

4. The buffer of claim 1, wherein said control logic has a module for adding a data word to said second storage area.

5. The buffer of claim 1, wherein said control logic has a module for removing a data word from said second storage area.

6. The buffer of claim 1, wherein said first plurality of data storage registers is arranged from a first register to a last register;

said second plurality of data storage registers is arranged from a first register to a last register; and said adjustable boundary is initially positioned between said last register of said first storage area and said last register of said second storage area.

7. The buffer of claim 6, wherein said first storage area is sequentially filled with data towards said adjustable boundary from said first register of said first plurality of data storage registers to said last register of said first plurality of data storage registers; and said second storage area is sequentially filled with data towards said adjustable boundary from said first register of said second plurality of data storage registers to said last register of said second plurality of data storage registers.

8. The buffer of claim 1, wherein said first storage area is a transmit buffer for storing data to be transmitted from said transmit buffer; and said second storage area is a receive buffer for storing data received in said receive buffer.

9. The buffer of claim 8, wherein said transmit buffer and said receive buffer store data from a serial communications interface.

10. The buffer of claim 1, further comprising:

a first head pointer associated with said first storage area for indicating a next storage register in said buffer for placing a new data word;

a first tail pointer for indicating a first register of said first storage area;

a second head pointer associated with said second storage area for indicating a next storage register in said buffer for placing a new data word; and a second tail pointer for indicating a first register of said second storage area.

11. The buffer of claim 10, wherein said buffer control logic monitors said first head pointer, said first tail pointer, said second head pointer, and said second tail pointer to move said adjustable boundary.

12. A method for storing a new piece of data in a buffer, said method comprising the steps of:

establishing a first storage area having a first plurality of data storage registers for storing data in said buffer;

establishing a second storage area having a second plurality of data storage registers for storing data in said buffer;

creating an adjustable boundary movable within said first storage area and said second storage area, said adjustable boundary defining the size of said first storage area and said second storage area;

detecting when any one of said storage areas is full;

determining if any one of said storage areas has an empty data register;

moving said adjustable boundary within said storage area having an empty data register so that said empty register is allocated to said full storage area and further such that the size of said storage area having an empty data register is reduced to zero when said storage area having an empty data register is comprised solely of empty registers and further when said new piece of data requires the total storage capacity of the empty registers; and storing said new piece of data in at least one empty register.

13. The method of claim 12, wherein said step of establishing a second storage area further comprises:

aligning said second storage area to said first storage area so that the bottom of said first storage area is adjacent to the bottom of said second storage area.

14. The method of claim 13, wherein said creating step further comprises:

initially positioning said adjustable boundary between the bottom of said first storage area and the bottom of said second storage area.

15. The method of claim 14, wherein said detecting step further comprises:

associating a first head pointer with said full storage area for indicating a next storage register in said buffer for placing said new piece of data; and associating a first tail pointer with said full storage area for indicating a first register containing data in said full storage area.

16. The method of claim 15, wherein said detecting step further comprises:

comparing the location of said adjustable boundary to the location of said first head pointer to determine if said first head pointer points beyond said adjustable boundary into said storage area having an empty data register.

17. The method of claim 14, wherein said determining step further comprises:

associating a second head pointer with said storage area having an empty data register for indicating a next storage register in said buffer for placing said new piece of data; and associating a second tail pointer with said storage area having an empty data register for indicating a first register containing data in said storage area having an empty data register.

18. The method of claim 17, wherein said determining step further comprises:

comparing the location of said first head pointer to said second head pointer and said second tail pointer to determine if any one of said storage areas has an empty register.

19. A computer program storage medium readable by a computing system and encoding a computer program of instructions for executing a method for storing a new piece of data in a buffer, said method comprising the steps of:

establishing a first storage area having a first plurality of data storage registers for storing data in said buffer;

establishing a second storage area having a second plurality of data storage registers for storing data in said buffer;

creating an adjustable boundary movable within said first storage area and said second storage area, said adjustable boundary defining the size of said first storage area and said second storage area;

detecting when any one of said storage areas is full;

determining if any one of said storage areas has an empty data register;

moving said adjustable boundary within said storage area having an empty data register so that said empty register is allocated to said full storage area and further such that the size of said storage area having an empty data register is reduced to zero when said storage area having an empty data register is comprised solely of empty registers and further when said new piece of data requires the total storage capacity of said empty registers; and storing said new piece of data in at least one empty register.

* * * * *